United States Patent [19]
Brezinski

[11] Patent Number: 5,976,416
[45] Date of Patent: Nov. 2, 1999

[54] CORROSION INHIBITED ORGANIC ACID COMPOSITIONS AND METHODS

[75] Inventor: Michael M. Brezinski, The Hague, Netherlands

[73] Assignee: Halliburton Energy Services, Inc., Duncan, Okla.

[21] Appl. No.: 08/855,083

[22] Filed: May 13, 1997

[51] Int. Cl.⁶ .............................. C09K 7/00; E21B 43/27
[52] U.S. Cl. .................. 252/389.62; 252/391; 252/395; 507/934; 507/939
[58] Field of Search ........................ 422/12; 252/389.62, 252/391, 395; 507/934, 939, 925, 933

[56] References Cited

U.S. PATENT DOCUMENTS

| | | | |
|---|---|---|---|
| 2,758,970 | 8/1956 | Sankaitis et al. | 252/8.55 |
| 3,094,490 | 6/1963 | Gardner et al. | 252/149 |
| 3,634,270 | 1/1972 | Engle et al. | 252/149 |
| 3,668,137 | 6/1972 | Gardner | 252/149 |
| 3,932,296 | 1/1976 | Byth | 252/148 |
| 3,992,313 | 11/1976 | Anderson et al. | 252/149 |
| 4,498,997 | 2/1985 | Walker | 252/8.55 C |
| 4,552,672 | 11/1985 | Walker | 252/8.55 C |
| 4,670,186 | 6/1987 | Quinlan | 252/392 |
| 4,684,507 | 8/1987 | Thompson et al. | 422/12 |
| 4,762,627 | 8/1988 | Martinez et al. | 252/8.555 |
| 5,264,141 | 11/1993 | Brezinski et al. | 252/8.552 |
| 5,366,643 | 11/1994 | Walker | 252/8.555 |
| 5,441,929 | 8/1995 | Walker | 507/260 |
| 5,622,919 | 4/1997 | Brezinski et al. | 507/90 |
| 5,674,817 | 10/1997 | Brezinski et al. | 507/258 |
| 5,697,443 | 12/1997 | Brezinski et al. | 166/307 |
| 5,756,004 | 5/1998 | Brezinski | 252/394 |
| 5,763,368 | 6/1998 | Brezinski | 507/240 |

*Primary Examiner*—Shean C. Wu
*Attorney, Agent, or Firm*—Robert A. Kent; Cliff Dougherty, III

[57] ABSTRACT

The present invention provides corrosion inhibited organic acid compositions and methods of using the compositions. The compositions basically comprise water, an organic acid, a corrosion inhibitor comprising at least one quaternary ammonium compound and a corrosion inhibitor activator selected from the group consisting of thioglycolic acid, an alkali metal thiosulfate and mixtures thereof.

28 Claims, No Drawings

CORROSION INHIBITED ORGANIC ACID COMPOSITIONS AND METHODS

BACKGROUND OF THE INVENTION

1. Field of the Invention.

The present invention relates to corrosion inhibited organic acid compositions which are effective in reducing metal corrosion and methods of using the compositions.

2. Description of the Prior Art.

Subterranean hydrocarbon containing formations penetrated by well bores are often treated with aqueous acid compositions to stimulate the production of hydrocarbons therefrom. One such treatment known as "acidizing" involves the introduction of an aqueous acid composition into a subterranean formation under pressure so that the acid composition flows through the pore spaces of the formation. The acid composition reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid composition into the fractures to etch the fracture faces whereby flow channels are formed when the fractures close. The aqueous acid composition also enlarges the pore spaces in the fracture faces and in the formation.

While acidizing and fracture-acidizing well stimulation treatments have been performed successfully over the years, a continuous problem which accompanies the treatments is the corrosion of metal pumps, tubular goods and other equipment used to introduce the aqueous acid compositions into the subterranean formation to be treated. The expense associated with repairing or replacing corrosion damaged tubular goods and equipment can be very high. The corrosion rate of metal equipment and tubular goods is increased by elevated temperatures encountered in deep formations, and the corrosion results in at least the partial neutralization of the aqueous acid compositions before they react with acid-soluble materials in the formations.

Aqueous acid compositions are also utilized in a variety of other industrial applications to contact and react with acid soluble materials. In such applications, metal equipment and metal surfaces are necessarily also contacted with the acid compositions, and the resulting corrosion of such metal equipment and surfaces is highly undesirable.

A variety of metal corrosion inhibited aqueous acid compositions for carrying out acidizing and fracture-acidizing stimulation treatments in wells and for performing other acidizing operations have been developed heretofore. For example, U.S. Pat. No. 4,498,997 issued to Walker on Feb. 12, 1985 discloses an aqueous acid composition containing a corrosion inhibitor comprising an acetylenic alcohol, a quaternary ammonium compound, an aromatic hydrocarbon and an antimony compound corrosion inhibitor intensifier.

U.S. Pat. Nos. 5,366,643 issued to Walker on Nov. 22, 1994 and 5,411,670 issued to Walker on May 2, 1995 both relate to metal corrosion inhibited aqueous acid compositions which utilize a source of antimony ions to increase the corrosion inhibiting effectiveness of the compositions.

U.S. Pat. No. 5,441,929 issued to Walker on Aug. 15, 1995 discloses a method of protecting metal alloys from acid corrosions utilizing an effective amount of a first inhibitor component including at least one reducing compound and a second inhibitor component including a source of molybdate ions.

While the above described metal corrosion inhibiting formulations have been used successfully as a part of aqueous inorganic acid compositions, e.g., aqueous hydrochloric acid compositions, the corrosion inhibitor formulations have generally been ineffective in organic acid solutions. That is, inorganic acid corrosion inhibitor activators (also referred to as intensifiers) such as formic acid, copper chloride, etc., do not function in organic acid compositions. In this regard, it has been found that the components of commonly utilized corrosion inhibitor formulations used in inorganic acid compositions will not function unless they are activated by a chloride concentration in the composition in the amount of about 5% to about 7% by weight. Because organic acid compositions do not contain appreciable concentrations of chloride, the corrosion inhibitor formulations do not function therein. Thus, there is a continuing need for improved metal corrosion inhibited organic acid compositions and methods of using such compositions in well acidizing applications.

SUMMARY OF THE INVENTION

The present invention provides effective metal corrosion inhibited organic acid compositions and methods of using such compositions for carrying out acidizing operations including well acidizing treatments which meet the needs described above and overcome the deficiencies of the prior art.

The metal corrosion inhibited organic acid compositions of this invention include corrosion inhibitor components and formulations used heretofore in aqueous inorganic acid compositions plus certain sulfur containing compounds which activate the corrosion inhibiting formulations in organic acids. That is, the corrosion inhibited organic acid compositions of this invention are basically comprised of an aqueous organic acid solution, a corrosion inhibitor comprising at least one quaternary ammonium compound and a corrosion inhibitor activator selected from the group consisting of thioglycolic acid, an alkali metal thiosulfate and mixtures thereof. The sulfur containing corrosion inhibitor activator is generally present in the aqueous organic acid composition in an amount in the range of from about 0.01% to about 2% by volume of the organic acid solution in the composition.

In addition to at least one quaternary ammonium compound, the corrosion inhibitor can comprise one or more additional components selected from the group consisting of unsaturated alcohols, unsaturated carbonyl compounds, unsaturated ether compounds, condensation products formed by reacting an aldehyde in the presence of a carbonyl compound or in the presence of a carbonyl compound and a nitrogen containing compound and various corrosion inhibitor intensifiers. Further, solvents, dispersing agents and other components commonly used in acidizing compositions can also be included.

The methods of this invention whereby acid soluble materials are contacted and reacted with an aqueous organic acid composition, but the corrosive effects of the aqueous organic acid on metal surfaces also contacted by the acid composition are minimized, are basically comprised of the steps of: combining a corrosion inhibitor including at least one quaternary ammonium compound and a corrosion inhibitor activator selected from the group consisting of thioglycolic acid, an alkali metal thiosulfate and mixtures thereof with the aqueous organic acid solution; and then contacting the acid soluble materials and metal surfaces therewith.

It is, therefore, a general object of the present invention to provide improved corrosion inhibited organic acid compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides improved metal corrosion inhibited organic acid compositions and methods of using the compositions. The improved corrosion inhibited organic acid compositions are basically comprised of water, an organic acid, a corrosion inhibitor comprising at least one quaternary ammonium compound and a corrosion inhibitor activator selected from the group consisting of thioglycolic acid, an alkali metal thiosulfate and mixtures thereof.

The water utilized to form the aqueous organic acid solutions and compositions can be any aqueous fluid which does not adversely react with the components of the acid compositions. For example, the water can be fresh water, brackish water, brine, salt-containing water solutions such as sodium chloride, potassium chloride or ammonium chloride solutions or the like.

The organic acid employed in the aqueous acid solution utilized is selected from the group consisting of formic acid, acetic acid, glycolic acid, citric acid and mixtures of such acids. A small quantity, e.g., about 1.5% by weight of the solution, of an inorganic acid such as hydrofluoric acid can also be admixed with the organic acid or acids used. Preferably, an aqueous organic acid solution is formed having an acid concentration in the range of from about 1% to about 30% by weight of the water in the solution, more preferably from about 1% to about 25% by weight of the water.

The corrosion inhibitor utilized in the organic acid compositions of this invention is preferably comprised of at least one quaternary ammonium compound of the general formula:

$$(R)_4N^+X^-$$

wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms.

Examples of quaternary ammonium compounds which can be included in the corrosion inhibitor are N-alkyl, N-cycloalkyl and N-alkylaryl pyridinium halides such as N-cyclohexyl-pyridinium bromide, N-octylpyridinium bromide, N-nonylpyridinium bromide, N-decylpyridinium bromide, N-dodecyl-pyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl) quinolinium chloride, N-benzylquinolinium chloride and the like. Other quaternary ammonium compounds include monochloromethylated and bizchloromethylated pyridinium halides, ethoxylated and propoxylated quaternary ammonium compounds, sulfated ethoxylates of alkylphenols and primary and secondary fatty alcohols, didodecyldimethylammonium chloride, hexadecylethyldimethylammonium chloride, 2-hydroxy-3-(2-undecylamidoethylamino)-propane-1-triethylammonium hydroxide, 2-hydroxy-3-(2-heptadecylamidoethylamino)-propane-1-triethylammonium hydroxide, and the like.

In addition to one or more of the quaternary ammonium compounds described above, the corrosion inhibitor may also include one or more additional compounds known for their corrosion inhibiting effectiveness in aqueous inorganic acid solutions including, but not limited to, unsaturated alcohols such as acetylenic alcohols, unsaturated carbonyl compounds, unsaturated ether compounds and the like.

Suitable acetylenic alcohols that can be used have the general formula:

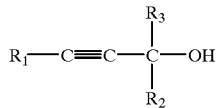

wherein $R_1$, $R_2$ and $R_3$ are hydrogen, alkyl, phenol, substituted phenol or hydroxyalkyl groups or radicals. Preferably, $R_1$ comprises a hydrogen radical, $R_2$ comprises a hydrogen radical, a methyl group, an ethyl group or a propyl group, and $R_3$ comprises an alkyl group having in the range of from 1 to 10 carbon atoms. Specific examples include methylbutynol, methylpentynol, hexynol, ethyloctynol, propargyl alcohol, benzylbutynol, ethylcyclohexanol and the like. Preferred alcohols are hexynol, propargyl alcohol, methylbutynol and ethyloctynyl.

Examples of unsaturated carbonyl compounds that can be used include 1-phenyl-1-ene-3-butanone and cinnamaldehyde.

An example of an unsaturated ether compound that can be used is 1-phenyl-3-methoxy-1-propene.

The corrosion inhibitor useful in accordance with this invention, i.e., a corrosion inhibitor comprised of at least one quaternary ammonium compound, and most preferably, at least one quaternary ammonium compound and one or more of the additional corrosion inhibiting components described above, is generally included in a corrosion inhibited aqueous organic acid composition of this invention in an amount in the range of from about 0.05% to about 3% by volume of the organic acid solution in the composition, more preferably from about 0.05% to about 2%.

The corrosion inhibitor activator of this invention, i.e., an activator selected from the group consisting of thioglycolic acid, an alkali metal thiosulfate and mixtures thereof, functions to activate the above described corrosion inhibitor components in an aqueous organic acid solution. Without such an activator, the corrosion inhibitor components will not function and acid corrosion of metal surfaces will take place.

The corrosion inhibitor activator is generally included in a corrosion inhibited aqueous organic acid composition of this invention in an amount in the range of from about 0.01% to about 2% by volume of aqueous organic acid solution in the composition.

In accordance with the methods of the present invention, acid soluble materials are contacted and reacted with an aqueous organic acid solution whereby the corrosive effect of the acid solution on metal surfaces also contacted by the acid solution is minimized. The methods are basically comprised of the steps of combining a corrosion inhibitor comprising at least one quaternary ammonium compound and a corrosion inhibitor activator selected from the group consisting of thioglycolic acid, an alkali metal thiosulfate and mixtures thereof with an aqueous organic acid solution, and then contacting the acid soluble materials and the metal surfaces with the aqueous organic acid solution containing the corrosion inhibitor and corrosion inhibitor activator.

As mentioned above, the aqueous organic acid solution preferably includes an organic acid selected from the group consisting of formic acid, acetic acid, glycolic acid, citric acid and mixtures of such acids in a concentration in the range of from about 1% to about 30% by weight of the solution, more preferably from about 1% to about 25% by weight of the solution. As also mentioned, the corrosion inhibitor is combined with the aqueous organic acid solution in an amount in the range of from about 0.05% to about 3% by volume of the organic acid solution in the composition, more preferably from about 0.05% to about 2%, and the corrosion inhibitor activator is combined therewith in an amount in the range of from about 0.01% to about 2% by volume of the organic acid solution in the composition.

The methods of this invention can be utilized in a variety of industrial acidizing applications and they are particularly suitable for carrying out acidizing and fracture acidizing procedures in wells to increase the production of hydrocarbons therefrom.

In order to further illustrate the corrosion inhibited organic acid compositions and methods of this invention, the following examples are given.

EXAMPLE 1

An aqueous formic acid composition containing formic acid in an amount of about 10% by weight of water in the composition was prepared. Various quantities of a corrosion inhibitor comprising benzylquinolinium chloride and a corrosion inhibitor activator of this invention, i.e., thioglycolic acid were added to test portions of the acid composition as shown in Table I below.

TABLE I

| | Corrosion Inhibited Test Compositions | |
|---|---|---|
| Composition Number | Corrosion Inhibitor, % by Volume of Aqueous Organic Acid Solution | Corrosion Inhibitor Activator[1], % by Volume of Aqueous Organic Acid Solution |
| 1 | 0.5 | 0.1 |
| 2 | 0.5 | 0.2 |
| 3 | 0.5 | 0.5 |
| 4 | 0.5 | 0 |
| 5 | 1.0 | 0.5 |
| 6 | 0.5 | 0.5 |
| 7 | 0.5 | 1.0 |
| 8 | 0.5 | 2.0 |
| 9 | 2.0 | 0.5 |
| 10 | 2.0 | 1.0 |
| 11 | 1.0 | 1.0 |
| 12 | 0 | 0 |
| 13 | 2.0 | 2.0 |
| 14 | 0 | 1.0 |
| 15 | 0.7 | 0.5 |
| 16 | 1.5 | 0.5 |
| 17 | 1.0 | 1.5 |
| 18 | 0.5 | 1.5 |
| 19 | 1.0 | 2.0 |
| 20 | 1.0 | 0 |

[1]An 80% by weight aqueous thioglycolic acid solution.

The various corrosion inhibited aqueous formic acid test compositions were heated to 300° F., and preweighed N-80 steel corrosion coupons, 13-Cr steel corrosion coupons or 22-Cr steel corrosion coupons were immersed in the test compositions for time periods of 5 hours, 6 hours and/or 16 hours while maintaining the temperatures of the compositions at 300° F. At the end of the test periods, the corrosion coupons were removed, rinsed and weighed to determine the amounts of corrosion that took place during the tests. The results of these tests are set forth in Table II below.

TABLE II

| Test Composition Number | Corrosion Coupon Material | Corrosion, lb/ft² hr. | | |
|---|---|---|---|---|
| | | 5 Hours | 6 Hours | 16 Hours |
| 1 | N-80 | — | 0.008 | — |
| 2 | N-80 | — | 0.012 | — |
| 3 | N-80 | — | 0.012 | — |
| 4 | N-80 | 0.467 | — | — |
| 5 | N-80 | — | 0.012 | 0.081 |
| 6 | N-80 | — | 0.013 | 0.062 |
| 7 | N-80 | — | — | 0.046 |
| 9 | N-80 | — | 0.012 | 0.044 |
| 10 | N-80 | — | — | 0.045 |
| 11 | N-80 | — | — | 0.045 |
| 12 | 13-Cr | — | — | 0.439 |
| 7 | 13-Cr | — | — | 0.296 |
| 4 | 13-Cr | — | — | 0.408 |
| 8 | 13-Cr | — | — | 0.306 |
| 5 | 13-Cr | 0.046 | — | — |
| 9 | 13-Cr | 0.034 | — | — |
| 13 | 13-Cr | 0.028 | — | — |
| 12 | 22-Cr | — | — | 0.050 |
| 7 | 22-Cr | — | — | 0.032 |
| 4 | 22-Cr | — | — | 0.004 |
| 14 | 22-Cr | 0.342 | — | — |

From Tables 1 and 2 above, it can be seen that the thioglycolic acid effectively activated the benzylquinolinium chloride and that the combination of the benzylquinolinium chloride and thioglycolic acid effectively inhibited corrosion of the various metal coupons at 300° F.

EXAMPLE 2

The test procedure set forth in Example 1 was repeated with the exception that the temperature was increased to 325° F. and the corrosion coupons were immersed in the compositions for time periods of 5 hours or 6 hours. The results of these tests are set forth in Table III below.

TABLE III

| Formic Acid Composition Corrosion Tests At 325° F. | | | |
|---|---|---|---|
| Test Composition Number | Corrosion Coupon Material | Corrosion, lb/ft² hr. | |
| | | 5 Hours | 6 Hours |
| 3 | N-80 | — | 0.016 |
| 15 | N-80 | — | 0.015 |
| 5 | N-80 | — | 0.017 |
| 7 | N-80 | — | 0.021 |
| 1 | N-80 | 0.033 | — |

From Tables 1 and 3 it can be seen that the corrosion inhibited organic acid compositions of this invention produce excellent results at 325° F.

EXAMPLE 3

The test procedure described in Example 1 above was repeated with the exception that the temperature was increased to 350° F. and the corrosion coupons were immersed in each composition for 5 hours or 6 hours. The results of these tests are set forth in Table IV below.

TABLE IV

Formic Acid Composition Corrosion Tests At 350° F.

| Test Composition Number | Corrosion Coupon Material | Corrosion, lb/ft² hr. | |
| --- | --- | --- | --- |
| | | 5 Hours | 6 Hours |
| 9 | N-80 | — | 0.038 |
| 16 | N-80 | — | 0.043 |
| 5 | N-80 | — | 0.046 |
| 11 | N-80 | — | 0.021 |
| 17 | N-80 | — | 0.030 |
| 7 | N-80 | — | 0.028 |
| 18 | N-80 | — | 0.034 |
| 19 | N-80 | — | 0.024 |
| 8 | N-80 | — | 0.030 |
| 20 | N-80 | 0.327 | — |
| 14 | N-80 | 0.465 | — |

From Tables 1 and 4, it can be seen that the corrosion inhibited organic acid compositions of this invention produced excellent results at 350° F., and that the best results were obtained when equal volumes of benzylquinolinium chloride containing corrosion inhibitor and thioglycolic acid (Composition 11) were used. This result is also shown in Table II by Composition 13 which contained equal volumes of benzylquinolinium chloride containing corrosion inhibitor and thioglycolic acid and produced the lowest corrosion in 5 hours as compared to Compositions 5 and 9.

EXAMPLE 4

The procedure described in Example 1 above was repeated with the exception that acetic acid was substituted for formic acid, only 16 hour tests were conducted and 13-Cr steel and 22-Cr steel coupons were utilized. The results of these tests are shown in Table V below.

TABLE V

Acetic Acid Composition Corrosion Tests At 300° F.

| Test Composition Number | Corrosion Coupon Material | Corrosion, lb/ft² hr. 16 Hours |
| --- | --- | --- |
| 12 | 13-Cr | 0.083 |
| 7 | 13-Cr | 0.015 |
| 4 | 13-Cr | 0.119 |
| 14 | 13-Cr | 0.462 |
| 12 | 22-Cr | 0.005 |
| 7 | 22-Cr | 0.001 |
| 4 | 22-Cr | 0.001 |

From Table 5 it can be seen that the corrosion inhibited organic acid compositions of the present invention produce excellent results.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of contacting and reacting acid soluble materials with an aqueous organic acid solution whereby the corrosive effect of the acid solution on metal also contacted thereby is minimized comprising the steps of:

combining a corrosion inhibitor comprising at least one quaternary ammonium compound and a corrosion inhibitor activator selected from the group consisting of thioglycolic acid, an alkali metal thiosulfate and mixtures thereof with said aqueous organic acid solution, said corrosion inhibitor activator and the organic acid of said organic acid solution being different compounds or different mixtures of compounds; and contacting said acid soluble materials and said metal with said aqueous organic acid solution containing said corrosion inhibitor and said corrosion inhibitor activator.

2. The method of claim 1 wherein said quaternary ammonium compound has the general formula $$(R)_4N^+X^-$$

wherein each R is the same or a different group selected from long chain alkyl groups, cycloalkyl groups, aryl groups or heterocyclic groups and X is an anion.

3. The method of claim 2 wherein said corrosion inhibitor further comprises one or more additional compounds selected from the group consisting of unsaturated alcohols, unsaturated carbonyl compounds and unsaturated ether compounds.

4. The method of claim 3 wherein said corrosion inhibitor is combined with said aqueous organic acid solution in an amount in the range of from about 0.05% to about 3% by volume of said aqueous organic acid solution.

5. The method of claim 4 wherein said corrosion inhibitor activator is combined with said aqueous organic acid solution in an amount in the range of from about 0.01% to about 2% by volume of said aqueous organic acid solution.

6. The method of claim 4 wherein said organic acid is selected from the group consisting of formic acid, acetic acid, glycolic acid, citric acid and mixtures thereof.

7. The method of claim 5 wherein said organic acid is present in said aqueous organic acid solution in an amount in the range of from about 1% to about 30% by weight of said water therein.

8. The method of claim 1 wherein said corrosion inhibitor comprises benzylquinolinium chloride.

9. A method of acidizing a subterranean formation penetrated by a well bore with an aqueous organic acid solution whereby the corrosive effect of the acid solution on metal contacted thereby is minimized comprising the steps of:

combining a corrosion inhibitor comprising at least one quaternary ammonium compound and a corrosion inhibitor activator selected from the group consisting of thioglycolic acid, an alkali metal thiosulfate and mixtures thereof with said aqueous organic acid solution, said corrosion inhibitor activator and the organic acid of said organic acid solution being different compounds or different mixtures of compounds; and contacting said subterranean formation with said aqueous organic acid solution containing said corrosion inhibitor and said corrosion inhibitor activator.

10. The method of claim 9 wherein said quaternary ammonium compound has the general formula $$(R)_4N^+X^-$$

wherein each R is the same or a different group selected from long chain alkyl groups, cycloalkyl groups, aryl groups or heterocyclic groups and X is an anion.

11. The method of claim 9 wherein said corrosion inhibitor further comprises one or more additional compounds selected from the group consisting of unsaturated alcohols, unsaturated carbonyl compounds and unsaturated ether compounds.

12. The method of claim 11 wherein said corrosion inhibitor is combined with said aqueous organic acid solution in an amount in the range of from about 0.05% to about 3% by volume of said aqueous organic acid solution.

13. The method of claim 12 wherein said corrosion inhibitor activator is combined with said aqueous organic acid solution in an amount in the range of from about 0.01% to about 2% by volume of said aqueous organic acid solution.

14. The method of claim 9 wherein said organic acid is selected from the group consisting of formic acid, acetic acid, glycolic acid, citric acid and mixtures thereof.

15. The method of claim 14 wherein said organic acid is present in said aqueous organic acid solution in an amount in the range of from about 1% to about 30% by weight of said water therein.

16. The method of claim 9 wherein said corrosion inhibitor is combined with said aqueous organic acid solution in an amount in the range of from about 0.05% to about 3% by volume of said aqueous organic acid solution.

17. The method of claim 16 wherein said corrosion inhibitor activator is combined with said aqueous organic acid solution in an amount in the range of from about 0.01% to about 2% by volume of said aqueous organic acid solution.

18. The method of claim 9 wherein said corrosion inhibitor activator is combined with said aqueous organic acid solution in an amount in the range of from about 0.01% to about 2% by volume of said aqueous organic acid solution.

19. The method of claim 9 wherein said corrosion inhibitor comprises benzylquinolinium chloride.

20. A method of acidizing a subterranean formation penetrated by a well bore with an aqueous organic acid solution whereby the corrosive effect of said acid solution on metal contacted thereby is minimized comprising the steps of:

combining a corrosion inhibitor and a corrosion inhibitor activator with said aqueous organic acid solution, said corrosion inhibitor being comprised of at least one quaternary ammonium compound and one or more additional compounds selected from the group consisting of acetylenic alcohols, unsaturated carbonyl compounds and unsaturated ether compounds, and said corrosion inhibitor activator being selected from the group consisting of thioglycolic acid, an alkali metal thiosulfate and mixtures thereof; and contacting said subterranean formation with said aqueous organic acid solution containing said corrosion inhibitor and said corrosion inhibitor activator.

21. The method of claim 20 wherein said quaternary ammonium compound is benzylquinolinium chloride.

22. The method of claim 20 wherein said corrosion inhibitor is comprised of a quaternary ammonium compound and an acetylenic alcohol, said acetylenic alcohol being selected from the group consisting of hexynol, propargyl alcohol, methylbutynol, ethyloctonyl and mixtures thereof.

23. The method of claim 20 wherein said corrosion inhibitor is combined with said aqueous organic acid solution in an amount in the range of from about 0.05% to about 3% by volume of said aqueous organic acid solution.

24. The method of claim 20 wherein said corrosion inhibitor activator is thioglycolic acid.

25. The method of claim 24 wherein said corrosion inhibitor activator is combined with said aqueous organic acid solution in an amount in the range of from about 0.01% to about 2% by volume of said aqueous organic acid solution.

26. The method of claim 20 wherein said organic acid is selected from the group consisting of formic acid, acetic acid, glycolic acid, citric acid and mixtures thereof.

27. The method of claim 26 wherein said organic acid is present in said aqueous organic acid solution in an amount in the range of from about 1% to about 30% by weight of said water in said composition.

28. The method of claim 20 wherein said aqueous organic acid solution is further characterized to include hydrochloric acid present in an amount of about 1.5% by weight of water therein.

* * * * *